United States Patent Office 3,235,577
Patented Feb. 15, 1966

3,235,577
POLYACETYLENIC CARBOXYLIC ACIDS AND THE ESTER AND AMIDE DERIVATIVES THEREOF
Bobby F. Adams, Painesville, Ohio, and John H. Wotiz, Huntington, W. Va., assignors to Diamond Alkali Company, Cleveland, Ohio, a corporation of Delaware
No Drawing. Filed Jan. 4, 1963, Ser. No. 249,328
9 Claims. (Cl. 260—404)

This invention relates to new compositions of matter, and more particularly to novel compounds represented by the following structure:

$$R^1C \equiv C[R^3C \equiv C(R^4C \equiv C)_m]_n R^2$$

wherein $R^1$ and $R^2$ are selected from the group consisting of hydrogen and $$\underset{C-R^5}{\overset{O}{\|}}$$

no more than one of $R^1$ and $R^2$ being hydrogen; $R^3$ and $R^4$ are divalent hydrocarbon radicals containing straight chains of at least one carbon atom; $R^5$ is selected from the group consisting of chlorine, $OZ^1$ and $$N\begin{matrix}Z^2\\ \diagdown \\ Z^3\end{matrix}$$

$Z^1$ is selected from the group consisting of alkyl, aryl and aralkyl; $Z^2$ and $Z^3$ are selected from the group consisting of hydrogen, alkyl, aryl and aralkyl; $m$ is an integer from 0 to 1, inclusive; and $n$ is an integer from 1 to 100, inclusive.

Still more particularly, this invention relates to compounds of the following structures:

$$R^6C \equiv C[(CH_2)_xC \equiv C]_n COOZ^1$$

and $$R^7C \equiv C[(CH_2)_xC \equiv C]_n CON\begin{matrix}Z^2\\ \diagdown \\ Z^3\end{matrix}$$

wherein $R^6$ is selected from the group consisting of hydrogen and $COOZ^1$; $R^7$ is selected from the group consisting of hydrogen and $$CON\begin{matrix}Z^2\\ \diagdown \\ Z^3\end{matrix}$$

$x$ is an integer which is equal to at least 1; and $Z^1$, $Z^2$, $Z^3$ and $n$ are as defined hereinabove.

Specific examples of compounds of this invention include the following:

Methyl 2,8-nonadiyne-1-oate $$HC \equiv C(CH_2)_4C \equiv C-COOCH_3$$

Methyl 2,8,14-pentadecatriyne-1-oate $$HC \equiv C[(CH_2)_4C \equiv C]_2 COOCH_3$$

Methyl 2,9,16-heptadecatriyne-1-oate $$HC \equiv C[(CH_2)_5C \equiv C]_2 COOCH_3$$

Methyl 2,8,14,20-heneicosatetrayne-1-oate $$HC \equiv C[(CH_2)_4C \equiv C]_3 COOCH_3$$

Di-n-butyl 2,8,14,20-docosatetrayne-1,22-dioate $$C_4H_9OOC-C \equiv C[(CH_2)_4C \equiv C]_3 COOC_4H_9$$

1-amido-1,8,15-hexadecatriyne $$HC \equiv C[(CH_2)_5C \equiv C]_2 CONH_2$$

Esters of this invention may be prepared by the reaction of a polyacetylenic carboxylic acid of the formula:

$$Y^1C \equiv C[R^3C \equiv C(R^4C \equiv C)_m]_n Y^2$$

wherein $Y^1$ and $Y^2$ are selected from the group consisting of hydrogen and carboxy, not more than one of $Y^1$ and $Y^2$ being hydrogen, and $R^3$, $R^4$, $m$ and $n$ are as defined hereinabove with an alcohol of the formula $Z^1OH$, wherein $Z^1$ is as defined hereinabove, in the presence of an acid catalyst. The reactants may be used in stoichiometric amounts, but it is frequently desirable to use an excess of the alcohol to promote complete conversion of the acid to the ester. If desired, the alcohol may be used as a solvent for the reaction; alternatively, solvents such as benzene, tetrahydrofuran, dioxane, and the like may be used. Water-immiscible solvents such as benzene are advantageous in that the water formed during the reaction may be removed by azeotropic distillation as the reaction proceeds.

Any one of a number of acidic substances may be used as catalysts in the reaction. Such substances include sulfuric acid, p-toluenesulfonic acid, zinc chloride, boron trifluoride, aluminum chloride, and the like. Only a trace of catalyst, of the order of 0.25–1.0% of the weight of acid used in the reaction, is necessary.

The temperature ordinarily required for the esterification reaction is about 50–100° C., preferably about 75–100° C. The reflux temperature of the solvent used is satisfactory. Under these conditions, the reaction may take from about eight hours to about six days to go to completion.

Compounds of this invention may also be prepared by the reaction of an acid chloride of the formula:

$$Y^3C \equiv C[R^3C \equiv C(R^4C \equiv C)_m]_n Y^4$$

wherein $Y^3$ and $Y^4$ are selected from the group consisting of hydrogen and COCl, not more than one of $Y^3$ and $Y^4$ being hydrogen, and $R^2$, $R^3$, $m$ and $n$ are as defined hereinabove, with a compound selected from the group consisting of $Z^1OH$ and $$\begin{matrix}Z^2\\ \diagdown \\ Z^3\end{matrix} NH$$

wherein $Z^1$, $Z^2$ and $Z^3$ are as defined hereinabove. Acid chlorides of the above formula may be prepared from the corresponding acids by reaction with thionyl chloride or the like.

This latter method of synthesis is particularly useful for the preparation of amides of this invention. Ordinarily, the acid chloride is first prepared from the desired acid and an excess (50% or more) of thionyl chloride, in the absence of solvent and at a temperature of about 40–80° C. The crude acid chloride is then combined with an excess of ammonia or the desired amine, in aqueous solution if desired. This reaction is ordinarily carried out at a rather low temperature, preferably about 0–15° C. If the amine to be used carries an aryl group, it may be necessary to use an alkali, e.g., sodium or potassium hydroxide, to promote reaction.

The compounds of this invention, if solids, may be purified by re-crystallization from a suitable solvent; e.g., methanol, ethanol, acetone, benzene, tetrahydrofuran, and the like. If liquids, they may be distilled either at atmospheric or at reduced pressure.

Compounds of this invention are useful as chemical intermediates, particularly for the formation of long-chain saturated compounds by hydrogenation or by oxidative coupling followed by hydrogenation. Many of these compounds have hitherto not been available, or have been obtainable only by costly and troublesome syntheses or separations from naturally occurring mixtures.

The compounds of the invention are also effective as pesticides for controlling fungi, bacteria, smuts, mildew, nematodes and other organisms in the class of plant pests.

While it is possible to apply the compounds of the present invention in undiluted form to the plant or other material to be protected, it is frequently desirable to apply the novel compounds in admixture with either solid or liquid inert, pesticidal adjuvants. Thus, the compounds can be applied to the plants for fungicidal purposes, for example, by spraying them with aqueous or organic solvent dispersions of the compound. Similarly, wood surfaces can be protected by applying a protective film of the compound by brushing, spraying or dipping utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchlorethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols such as ethanol, isopropanol and amyl alcohol, etc.

The compounds can also be applied to plants and other materials along with inert solid fungicidal adjuvants or carriers such as talc, pyrophyllite, Attaclay, kieselguhr, chalk, diatomaceous earth, lime, calcium carbonate, bentonite, fuller's earth, cotton-seed hulls, wheat flour, soybean flour, etc., pumice, tripoli, wood flour, walnut shell flour and lignin.

It is frequently desirable to incorporate a surface active agent in the pesticidal compositions of this invention. Such surface actives agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention can be employed in compositions containing other pesticides, more especially fungicides, insecticides and bactericides, e.g., phenothiazine, pyrethrum, rotenone, DDT, etc.

The following examples are given in order that those skilled in the art may more completely understand the invention and the preferred means by which the same may be carried into effect.

EXAMPLE 1

*Preparation of methyl 2,8-nonadiyne-1-oate*

A five-liter, three-necked flask fitted with a reflux condenser, stirrer and addition funnel and charged with a suspension of 195 g. (5 moles) of sodamide in 2800 ml. of diethylene glycol dimethyl ether (diglyme), is heated to 135 to 150° C. in an oil bath, with stirring, 1,7-octadiyne, 265 g. (2.5 moles), is added slowly over two hours and the mixture is heated and stirred for an additional 45 minutes. It is then cooled to room temperature and carbon dioxide is passed through the stirred mixture for three and one-half hours.

To the resulting sodium salt suspension is added 620 g. (5 moles) of dimethyl sulfate. The reaction mixture is stirred at 90 to 105° C. for four hours and then cooled and treated with one liter of 5% aqueous sodium carbonate solution. The organic layer is separated, dried over sodium sulfate and distilled. After removal of the diglyme (B.P. 46–80° C./20–30 mm. Hg), the desired crude methyl 2,8-nonadiyne-1-oate is obtained, B.P. 70 to 135° C./0.1 mm. Hg). The yield is 53 g. or 12% of the theoretical amount. Vapor phase chromatographic analysis of the material shows it to be about 82% pure with the impurity being the rearranged isomer, methyl 2,7-nonadiyne-1-oate.

The higher-boiling fractions from the distillation consists chiefly of dimethyl 2,8-decadiyne-1,10-dioate.

EXAMPLE 2

*Preparation of 2,8,14-pentadecatriyne-1-oic acid*

A five-liter, three-necked flask, equipped with a stirrer and a Dry Ice condenser, is charged with four liters of anhydrous liquid ammonia and 501 g. (2.7 moles) of 1,7-13-tetradecatriyne is added slowly as the mixture is stirred. The ammonia is allowed to evaporate and is gradually replaced by a mixture of equal volumes of ether, benzene and tetrahydrofuran.

After the ammonia has been removed, the mixture is transferred to a 10-gallon autoclave with about 25 pounds of Dry Ice. The autoclave is sealed and charged with additional carbon dioxide to a pressure of about 400 p.s.i.g. The pressurized mixture is stirred for seventy-two hours, after which excess water is added and the organic and aqueous layers are separated. Evaporation of the organic layer affords 325 g. (65% recovery) of impure 1,7,13-tetradecatriyne.

The aqueous layer is acidified with hydrochloric acid and extracted with ether. Evaporation of the ether and extraction of the solid product with pentane in a Soxhlet extractor results in the isolation of a pentane-soluble and a pentane-insoluble fraction, weighing, after evaporation of the solvent, 51 g. and 126 g., respectively. The pentane-soluble product is 2,8,14-pentadecatriyne-1-oic acid, $C_{15}H_{18}O_2$, M.P. 35° C., as identified by infrared spectrum and by the following analytical data.

| Element | Actual percent by weight | Calculated percent by weight |
| --- | --- | --- |
| Carbon | 78.3 | 78.2 |
| Hydrogen | 7.8 | 7.9 |
| Neutralization equivalent | 229 | 230 |

The pentane-insoluble product is identified as 2,8-14-hexadecatriyne-1,16-dioic acid.

EXAMPLE 3

*Preparation of methyl 2,8,14-pentadecatriyne-1-oate*

A solution of 47.7 g. (0.21 mole) of 2,8,14-pentadecatriyne-1-oic acid and 0.2 g. of p-toluenesulfonic acid in 350 ml. of methanol and 200 ml. of benzene is heated under reflux for three days. The water formed in the reaction is collected in a Dean and Stark trap. The solvent is removed by vacuum evaporation and the crude product is washed with 5% aqueous sodium bicarbonate to remove unreacted acid; upon acidification of the wash liquid, 7.6 g. of 2,8,14-penetadecatriyne-1-oic acid is recovered.

The washed crude product is distilled under reduced pressure. There is obtained 36.7 g. (86.5% of the theoretical amount, taking into consideration recovery of unreacted acid) of methyl 2,8,14-pentadecatriyne-1-oate, $C_{16}H_{20}O_2$, B.P. 132-133° C. at a pressure of 0.08 mm. of mercury. The assigned structure is confirmed by infrared analysis and by the following analytical results.

| Element | Actual percent by weight | Calculated percent by weight |
| --- | --- | --- |
| Carbon | 78.7 | 78.65 |
| Hydrogen | 8.1 | 8.25 |

EXAMPLE 4

*Preparation of 2,9,16-heptadecatriyne-1-oic acid*

Two moles of 1,8,15-hexadecatriyne disodium salt is prepared from 2 moles of 1,8,15-hexadecatriyne and 5 moles of sodamide in 3.5 liters of anhydrous ammonia. The ammonia is replaced by 5 gallons of a 1:1 (by vol.) mixture of ether and benzene and pressurized with carbon dioxide in a 10-gallon autoclave for 60 hrs. at 25° C. and 500 p.s.i. The autoclave is vented and the mixture poured into 1 gallon of water. The top layer is separated, dried and solvent-stripped to recover 160 g. of neutral fraction. The aqueous layer is acidified with HCl and the precipitated solid taken into ethyl ether. The ether is removed in vacuo, and the deposited crude acid is extracted with n-pentane in a Soxhlet extractor. The resultant solution, on chilling, gives 30 g. (6.5% of theory) of white crystals, M.P. 51-2° C., and is identified as 2,9,16-heptadecatriyne-1-oic acid. The results of the chemical analysis indicate the formation of the desired $C_{17}H_{22}O_2$, and are as follows:

| Element | Actual percent by weight | Calculated percent by weight |
| --- | --- | --- |
| Carbon | 79.1 | 79.0 |
| Hydrogen | 8.6 | 8.6 |

The actual neutralization equivalent found is 246, while the calculated value is 258. The infrared spectrum is consistent with the assigned structure.

EXAMPLE 5

*Preparation of methyl 2,9,16-heptadecatriyne-1-oate*

The procedure of Example 3 is followed, except that the acid used is 2,9,16-heptadecatriyne-1-oic acid, 54.2 g. (0.21 mole). After washing with aqueous sodium bicarbonate, the crude product is distilled and 44.5 g. (78% of the theoretical amount) of methyl 2,9,16-heptadecatriyne-1-oate, $C_{18}H_{24}O_2$, is obtained, B.P. 134–136° C. at a pressure of 0.06 mm. of mercury. Analytical results as given below and infrared spectral data confirm the proposed structure.

| Element | Actual percent by weight | Calculated percent by weight |
| --- | --- | --- |
| Carbon | 79.1 | 79.5 |
| Hydrogen | 8.6 | 8.5 |
| Molecular weight | 280 | 272 |

EXAMPLE 6

*Preparation of 2,8,14,20-heneicosatetrayne-1-oic acid and 2,8,14,20-docosatetrayne-1,22-dioic acid*

Three moles of 1,7,13,19-eicosatetrayne disodium salt is prepared from 798 g. (3 moles) of 1,7,13,19-eicosatetrayne and 7 moles of $NaNH_2$ in 3.5 liters of anhydrous ammonia. The ammonia is replaced by 6 gallons of a 1:1:1 (by volume) mixture of benzene, ethyl ether and tetrahydrofuran and the suspended salt pressurized wtih $CO_2$ at 25° C. and 500 p.s.i. in a 10-gallon autoclave for 60 hrs. After venting, the mixture is treated with 1 gallon of water and worked up as in Example 3. A neutral fraction containing 354 g. of the tetrayne is recovered. Extraction of the crude acid with n-pentane gives 133 g. (26% conversion) of soluble white product, M.P. 54–5° C., which is identified as 2,8,14,20-heneicosatetrayne-1-oic acid. The results of the chemical analysis indicate the formation of the desired $C_{21}H_{26}O_2$,

| Element | Actual percent by weight | Calculated percent by weight |
| --- | --- | --- |
| Carbon | 80.9 | 81.3 |
| Hydrogen | 8.4 | 8.4 |

The actual neutralization equivalent found is 313, while the calculated value is 310. The infrared spectrum is consistent with the assigned structure. The n-pentane-insoluble fraction is crystallized from ethyl ether to give 290 g. (49% conversion) of white powder, M.P. 104–5° C., and is identified as 2,8,14,20-docosatetrayne-1,22-dioic acid. The results of the chemical analysis indicate the formation of the desired $C_{22}H_{26}O_4$, and are as follows:

| Element | Actual percent by weight | Calculated percent by weight |
| --- | --- | --- |
| Carbon | 74.5 | 74.6 |
| Hydrogen | 7.5 | 7.35 |

EXAMPLE 7

*Preparation of methyl 2,8,14,20-heneicosatetrayne-1-oate*

A solution of 103 g. (0.33 mole) of 2,8,14,20-heneicosatetrayne-1-oic acid and 1 g. of p-toluenesulfonic acid in 125 ml. of methanol and 450 ml. of benzene is heated under reflux in a nitrogen atmosphere for 118 hours. The water formed in the reaction is continuously removed by means of a Dean and Stark trap. The crude reaction product, after vacuum evaporation of the solvent, is washed with 5% aqueous sodium hydroxide, dried over calcium chloride and distilled under reduced pressure. The desired methyl 2,8,14,20-heneicosatetrayne-1-oate, $C_{22}H_{28}O_2$, is obtained at a boiling point of 172–174° C. under a pressure of 0.06 mm. of mercury. The yield is 79.5 g., or 75% of the theoretical amount. The following analytical data, together with the infrared spectrum, confirm the assigned structure.

| Element | Actual percent by weight | Calculated percent by weight |
|---|---|---|
| Carbon | 81.1 | 81.4 |
| Hydrogen | 8.9 | 8.7 |
| Molecular weight | 332 | 324 |

EXAMPLE 8

*Preparation of di-n-butyl 2,8,14,20-docosatetrayne-1,22-dioate*

2,8,14,20-docosatetrayne-1,22-dioic acid, 177 g. (0.5 mole), is heated under reflux with 82 g. (1.1 moles) of n-butanol, 1 g. of p-toluenesulfonic acid and 500 ml. of benzene. The course of the reaction is followed by measuring the amount of water collected in a Dean and Stark trap. When the theoretical amount of water (9.0 ml.) has been collected, the solvent is removed by vacuum evaporation. The residual oil is washed several times with 5% aqueous sodium bicarbonate and dried over calcium chloride. After a treatment with decolorizing charcoal to remove impurities, the oil is heated at about 50° C. for three hours under a high vacuum. It is kept out of contact with air by means of a nitrogen bleed into the system.

The product, di-n-butyl 2,8,14,20-docosatetrayne-1,22-dioate, $C_{30}H_{42}O_4$, weighs 173 g. (80% of the theoretical amount). When distillation is attempted, it decomposes at about 280° C. under pressure of 0.02 mm. of mercury. Infrared spectral data and the following analytical results confirm the assigned structure.

| Element | Actual percent by weight | Calculated percent by weight |
|---|---|---|
| Carbon | 77.4 | 77.3 |
| Hydrogen | 9.0 | 9.0 |

EXAMPLE 9

*Preparation of 1-amido-1,8,15-hexadecatriyne*

A mixture of 46.5 g. (0.18 mole) of 2,9,16-heptadecatriyne-1-oic acid and 28.8 g. (0.24 mole) of thionyl chloride is heated at about 50–60° C. until gas evolution ceases. The excess thionyl chloride is removed in vacuo and the residual oil is poured into a mixture of ice and concentrated ammonium hydroxide solution, the latter being present in large excess. A tan solid is formed; the crude yield is 35 g., or 75.6% of the theoretical amount. It is treated with decolorizing charcoal and recrystallized from ethanol. The purified 1-amido-1,8,15-hexadecatriyne, $C_{17}H_{23}NO$, melts at 77–78° C. The proposed structure is confirmed by the following analytical results, and the infrared spectrum.

| Element | Actual percent by weight | Calculated percent by weight |
|---|---|---|
| Carbon | 81.4 | 79.3 |
| Hydrogen | 8.9 | 9.0 |
| Nitrogen | 5.5 | 5.4 |

EXAMPLE 10

*Fungicidal activity*

The tomato foliage disease test measures the ability of the test compound to protect tomato foliage against infection by the early blight fungus *Alternaria solani* and the late blight fungus *Phytophthora infestans*. Results from this test indicate whether a compound may have practical use as a foliage protectant fungicide.

The method used employs tomato plants (var. Bonny Best) five to seven inches high which are four to six weeks old. Duplicate plants, one set for each test fungus, are sprayed with 100 ml. of each of two test formulations as follows:

*Formulation 1.*—0.1 gram of the test compound, 5 ml. of acetone and 2.5 ml. of a stock solution of 0.5% Triton X-155 emulsifier in water, diluted with water to a total volume of 100 ml. (Final concentration of test compound 1000 p.p.m.)

*Formulation 2.*—0.02 gram of the test compound; otherwise same as Formulation 1. (Final concentration of test compound 200 p.p.m.)

These formulations are sprayed on the plants at 40 pounds air pressure as the plants are rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight, lesion counts are made on the three uppermost fully expanded leaves. The data is converted to percentage disease control based on the number of lesions obtained on the control plants.

When tested by this method, 1-amido-1,8,15-hexadecatriyne gives the following results:

| Test | Percent control | |
|---|---|---|
| | 1,000 p.p.m. | 200 p.p.m. |
| Early blight | 86 | 73 |
| Late blight | 47 | 21 |

EXAMPLE 11

*Bactericidal activity*

Test chemicals are examined for ability to inhibit the growth of three bacterial species (*Erwinia amylovora*, *Xanthomonas phaseoli* and *Micrococcus pyrogenes* var. *aureus*). The first two above named test species are Gram negative rods, the third species is Gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbidimetric measurement.

Each of three test tubes arranged in a rack receive one ml. of the test formulation prepared from 0.1 g. of the test compound, 4 ml. of acetone, and 2 ml. of a 0.5 % stock solution of Triton X–155 emulsifier in water, diluted with water to 80 ml. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard four mm. platinum loop to 7 ml. of sterile broth in test tubes arranged in racks similar to those for the medication tubes. The broth tubes are then incubated for 48 hours at 29° to 31° C., at which time growth is measured by use of a Bausch & Lomb spectronic "20" direct reading colorimeter. A reading is recorded for each test tube after shaking. Usually three replicates of each organism serve as controls. Calculations are made on percent of the mean check readings. This figure substracted from 100 gives percent control as compared to checks.

When tested by this method, methyl 2,9,16-heptadecatriyne-1-oate (I) and methyl 2,8,14,20-heneicosatetrayne-1-oate (II) give the following results.

| Compound | Percent control | | |
|---|---|---|---|
| | E. amylovora | X. phaseoli | S. aureus |
| I | 100 | 16 | 100 |
| II | 100 | 50 | 20 |

EXAMPLE 12

*Herbicidal activity*

To evaluate the postemergence activity of test chemicals applied to the foliage of seedling plants, as well as to the soil in which they are growing, two mixtures of seed are planted in soil contained in metal half-flats, which are 8 x 12 inches at the soil surface. One-half of each pan is planted to a mixture containing three broadleaves: buckwheat, aster, and turnip. The other half of the pan is seeded to a mixture of three grasses: millet, perennial ryegrass, and sorghum. One-half level teaspoon of each seed mixture is planted in each pan. The flats are removed to the greenhouse and the test species are allowed to grow until one true leaf is present on the slowest growing broadleaf (aster). This requires 9 to 14 days. At this point the pans are sprayed at 10 p.s.i. uniformly covering the surface of the soil with 40 ml. of test formulation containing 165.6 mg. or 82.8 mg. of toxicant, which is equivalent to 24 or 12 pounds per acre respectively. The formulation contains the toxicant, equal volumes of water and acetone, and 2 drops of Triton X–155 emulsifier.

Two weeks after treatment, percent control is estimated and information on phytotoxicity, growth regulation, and other effects is recorded.

The following results are obtained when methyl 2,9,16-heptadecatriyne-1-oate (I) and methyl 2,8,14-pentadecatriyne-1-oate (III) are tested by this method.

| Compound | Percent control | | |
|---|---|---|---|
| | Dosage, lbs. per acre | Broadleaves | Grasses |
| I | 24 | 45 | 60 |
| III | 12 | 99 | 60 |

It is to be understood that although the invention has been described with specific reference to particular embodiments thereof, it is not to be so limited, since changes and alternations therein may be made which are within the full intended scope of this invention as defined by the appended claims.

What is claimed is:
1. A compound of the formula:

wherein $R^1$ and $R^2$ are selected from the group consisting of hydrogen and

not more than one of $R^1$ and $R^2$ being hydrogen; $R^3$ and $R^4$ are divalent hydrocarbon radicals containing straight chains having four to five carbon atoms $R^5$ is selected from the group consisting of chlorine, $OZ^1$ and

$Z^1$ is lower alkyl; $Z^2$ and $Z^3$ are hydrogen; $m$ is an integer from 0 to 1, inclusive; and $n$ is an integer from 1 to 3, inclusive.

2. A compound of the formula:

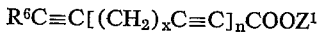

wherein $R^6$ is selected from the group consisting of hydrogen and $COOZ^1$; $Z^1$ is lower alkyl; $n$ is an integer from 1 to 3, inclusive; and $x$ is an integer from 4 to 5, inclusive.

3. Methyl 2,8-nonadiyne-1-oate.
4. Methyl 2,8,14-pentadecatriyne-1-oate.
5. Methyl 2,9,16-heptadecatriyne-1-oate.
6. Methyl 2,8,14,20-heneicosatetrayne-1-oate.
7. Di-n-butyl 2,8,14,20-docosatetrayne-1,22-dioate.
8. A compound of the formula:

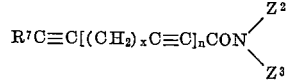

wherein $R^7$ is selected from the group consisting of hydrogen and

$Z^2$ and $Z^3$ are hydrogen; $n$ is an integer from 1 to 3, inclusive; and $x$ is an integer from 4 to 5, inclusive.

9. 1-amido-1,8,15-hexadecatriyne.

References Cited by the Examiner

UNITED STATES PATENTS

| | | | |
|---|---|---|---|
| 750,213 | 1/1904 | Moureu | 260—410.9 |
| 2,488,650 | 11/1949 | Tindall | 260—404 |
| 2,488,999 | 11/1949 | Ullmann et al. | 260—404 |
| 2,620,291 | 12/1952 | Johnson et al. | 167—22 |
| 3,033,884 | 5/1962 | Osbond et al. | 260—410.9 XR |
| 3,034,948 | 5/1962 | Nametz | 167—22 |

OTHER REFERENCES

Harwood: "American Oil Chemists' Society Journal," vol. 31, pages 559–60 (1954).

CHARLES B. PARKER, *Primary Examiner.*